Figure 1:
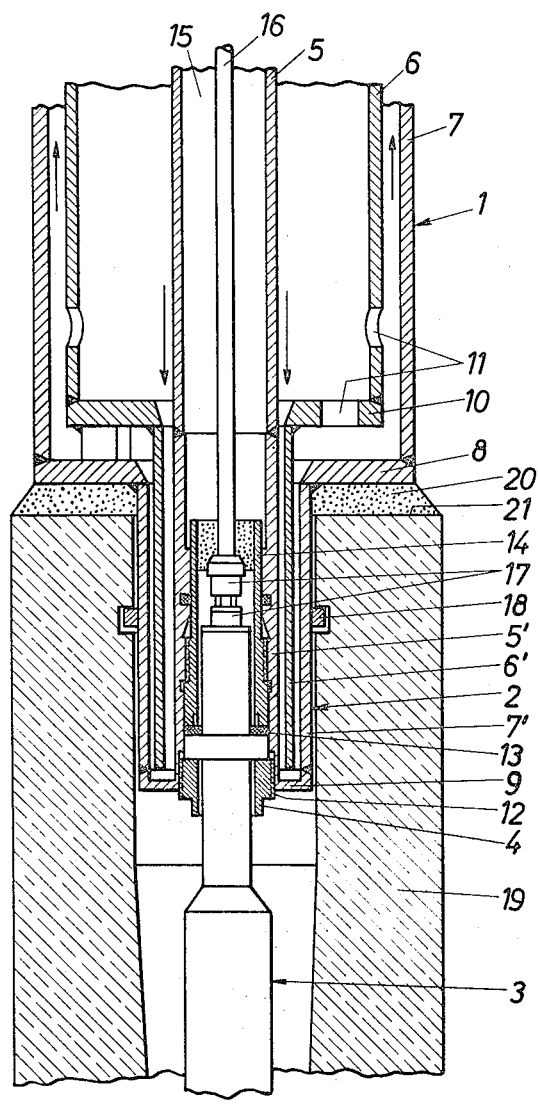

United States Patent [19]
Smejkal et al.

[11] 3,757,579
[45] Sept. 11, 1973

[54] WATER-COOLED MEASURING PROBE FOR CONTINUOUSLY MEASURING THE TEMPERATURE OF HOT LIQUID METAL BATHS IN GREAT BASIC OXYGEN CONVERTERS

[75] Inventors: Hellmuth Smejkal; Gunter Poferl, both of Linz, Austria

[73] Assignee: Vereinigte Osterreichische Eisen-und Stahlweke Aktiengesellschaft, Linz, Austria

[22] Filed: Aug. 2, 1971

[21] Appl. No.: 168,267

[30] Foreign Application Priority Data
Aug. 17, 1970 Austria..................................... 7434

[52] U.S. Cl.................. 73/343 R, 73/359, 136/230
[51] Int. Cl. ............................................. G01k 1/14
[58] Field of Search............................. 73/343, 359; 136/231, 234, 230, 232, 233

[56] References Cited
UNITED STATES PATENTS
3,250,125  5/1966  Bonn................................ 73/343 R
3,530,716  9/1970  Truppe.............................. 73/343 R Primary Examiner—Richard C. Queisser
Assistant Examiner—Denis E. Corr
Attorney—Granville M. Brumbaugh et al.

[57] ABSTRACT

The invention relates to a water-cooled measuring probe for continuously measuring the temperature of hot liquid metal baths, comprising a probe body, a probe head set back relative to said body in shoulder-like fashion under formation of an annular floor part enclosing with the longitudinal axis of the probe an angle of 80° – 120°, a sensing portion and a refractory jacket releasably attached to the probe body and surrounding said probe head and sensing portion. Thus the stability of the measuring probe is enhanced without impairing the strength of the connection between probe head and refractory jacket or the measuring accuracy.

2 Claims, 3 Drawing Figures

WATER-COOLED MEASURING PROBE FOR CONTINUOUSLY MEASURING THE TEMPERATURE OF HOT LIQUID METAL BATHS IN GREAT BASIC OXYGEN CONVERTERS

The invention relates to a water-cooled measuring probe for continuously measuring the temperature of hot liquid metal baths in great basic oxygen converters at the head of which a sensing portion is joined which immerses into the metal melt and is surrounded by a releasably arranged refractory jacket.

Water-cooled measuring probes for continuously measuring the temperatures of pig iron and steel in basic oxygen converters are similarly designed as oxygen blowing lances. Such probes comprise an inner tube, an outer tube and a water conduit tube arranged between the two; they are provided with a cross section which is uniform over their total length. The sensing portion immersing into the melt and containing a thermocouple is screwed to the lower part of the probe, the so-called probe head, and may be connected with the compensating line which ends in the probe head by means of a releasable plug connection. As a protection against the slag which is floating on the pig iron or steel bath, the sensing portion is surrounded by a refractory jacket over the main part of its longitudinal extension; this jacket is releasably fixed to the outer tube of the probe head. In order to obtain exact and reproduceable measurement results it is necessary to provide the named construction elements with the appropriate dimensions and with an adequate cooling so that the temperature in the area surrounding the plug connection does not increase beyond 100° C. On the other hand the cooling of the probe head must not influence the temperature at the sensing point of the sensing portion, i.e. at the hot junction of the thermocouple, because otherwise too low a metal bath temperature would be indicated.

When short probes are used with a diameter which remains uniform over the total length, in general satisfactory results are obtained. It has, however, turned out that in great converters considerable difficulties occur because the probe length may amount up to about 20 m. Thin probes of such a length are not sufficiently stable, they tend to swing in pendulum fashion and may be bent. Also, they are easily damaged by the steel and slag melt which is in great agitation during the blowing process. If, however, the measuring probes are designed with greater cross section difficulties arise with regard to fixing the sensing portion and the refractory jacket at the probe head and the measuring accuracy is deteriorated.

The invention is aimed at avoiding the named difficulties and at enhancing the stability of the measuring probe without impairing the strength of the connection between the probe head and the refractory jacket surrounding the sensing portion and without impairing the measuring accuracy.

In a measuring probe of the kind defined in the introduction the invention resides in that the probe head relative to the part of the measuring probe is bent in like a shoulder under formation of an annular floor part enclosing with the longitudinal axis of the probe an angle of 80°–120°, preferably of 90°, the refractory jacket surrounding the sensing portion encasing also the bent-in probe head.

Advantageously ramming mass is supplied between the front face of the refractory jacket and the annular floor part. Preferably the bent-in probe head is provided with a coolant circulation which is branched off from the coolant circulation of the part of the measuring probe.

In order that the invention may be more fully understood three embodiments thereof shall now be explained with reference to the drawings FIG. 1 is a vertical sectional view of the lower part of a measuring probe according to the invention.

Figure 2:
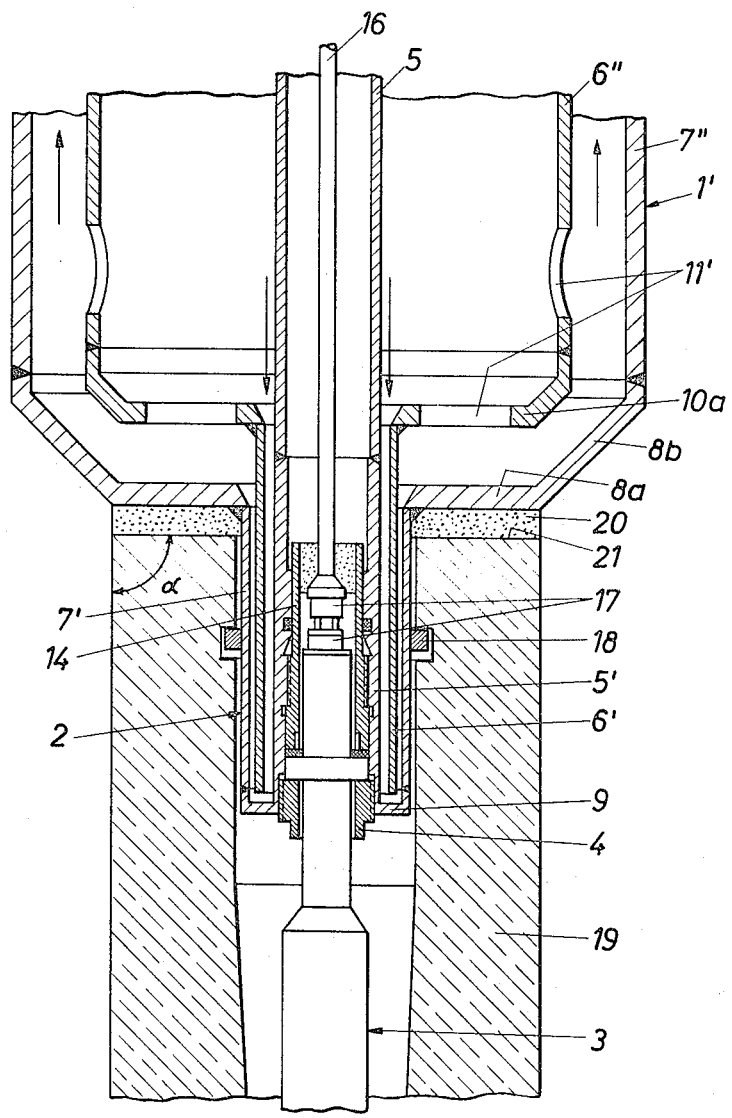
Figure 3:
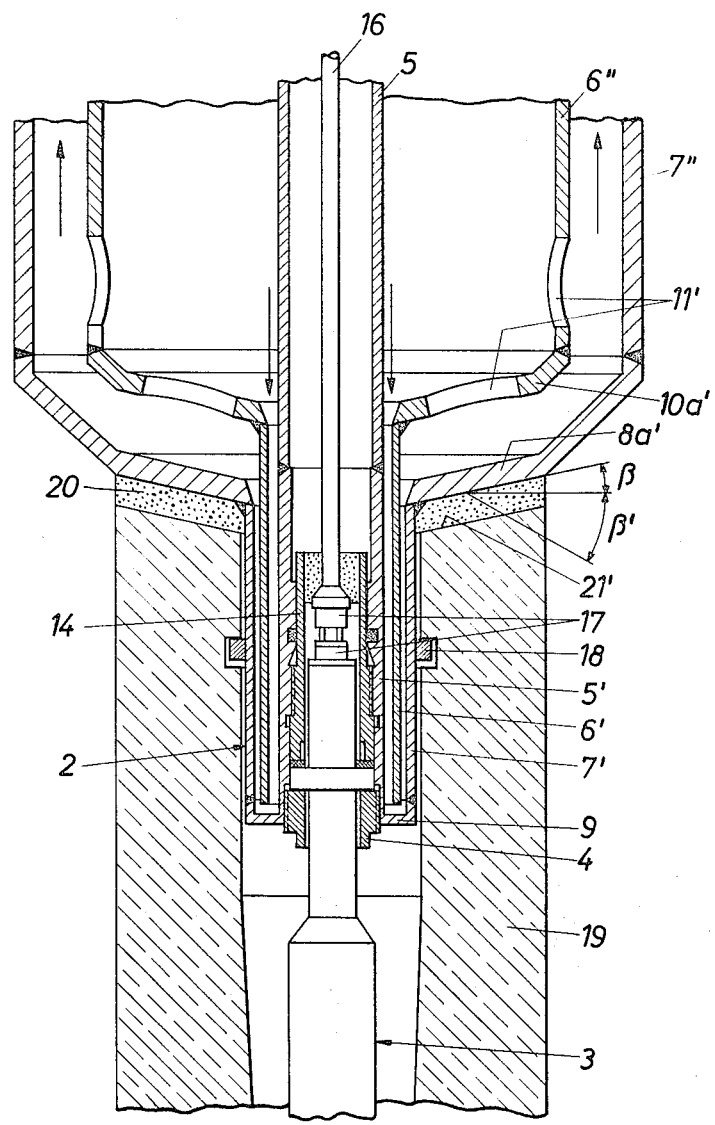

FIGS. 2 and 3 show in similar representations two further embodiments of measuring probes.

In FIG. 1 a measuring probe is shown which over its longitudinal extension is provided in part 1 with a greater diameter than the probe head 2 which is joined to part 1. The sensing portion 3 housing the thermocouple is fixed to the probe head 2 by means of a nut 4; the sensing portion immerses into the melt. The measuring probe comprises in part 1 the inner tube 5, the outer tube 7 and the conduit tube 6 as a circulation means for a coolant in direction of the arrows shown in the drawing. The probe 2 head comprises the inner tube 5', the outer tube 7' and the conduit tube 6'. As may be derived from the drawing, the outer tube 7 of the probe 1 is set back in shoulder-like fashion under formation of an annular floor part 8 and continues as the outer tube 7' of the probe head 2. In a similar way also the guiding tube 6 is set back under formation of an annular transitory part 10 and continues in the guiding tube 6' of the probe head. The outer tube 7' and the inner tube 5' of the probe head are connected with each other by means of the annular part 9. The annular floor part 8 encloses with the probe axis an angle of 90°. The guiding tube 6 of the probe part 1 and its transitory part 10 are provided with several bores 11 through which the main portion of the coolant flows into the annular canal formed by the tubes 7 and 6; in a measuring probe for a 50 m.t. basic oxygen converter the bores 11 are dimensioned e.g. so that, when a total of 50 m³ of water are supplied per hour, about 5 m³/h flow through the probe head 2, while about 45 m³/h are guided off via the bores 11. The sensing portion 3 is tightened towards a sealing 13 by screwing the nut 4 into the thread 12 of the inner tube 5'. The sealing seals a sleeve-shaped construction element 14 against the penetration of condensing water from the inner space 15 of the measuring probe. A compensating line denoted with 16 is guided from the upper end of the measuring probe through the inner space 15 to a releasable plug connection 17. In the area of the plug connection the temperature should not increase above 100° C. At the outside of the probe head, at a holding device 18, a refractory jacket 19 is releasably connected by means of a bayonet catch not illustrated which jacket surrounds the bent-in probe head and the sensing portion 3 over the greatest part of its longitudinal extension and protects it from the influence of slag. Between the front face 21 of the jacket 19 and the annular floor part 8 of a refractory ramming mass 20 is inserted in order to prevent the intrusion of liquid metal to the probe head or to the sensing portion.

In FIGS. 2 and 3 for the same construction elements the same numerals are used as in FIG. 1. The upper part of the measuring probes according to FIGS. 2 and 3 with its outer tube 7" has an essentially greater outer diameter than the measuring probe according to FIG. 1, whereas the outer diameter of the probe head 2 and the refractory jacket 19 fixed thereto are of the same dimensions with all probes; thus it is guaranteed that the dimensioning and cooling conditions are the same with all three probes in the area of the plug connection. The bores 11' in the water guiding tube 6'' and in the transitory part 10a and 10a' respectively, are dimensioned in a manner that about 5 m³ of water are guided per hour to the bent-in probe head 2; the flow direction is again indicated by arrows. In the illustration of FIG. 2 the outer tube 7'' of the probe part 1' is bent in like a shoulder under formation of a part 8b designed as a conical plane and a substantial horizontal, annular floor part 8a and continues in the outer tube 7' of the probe head 2. In the measuring probe shown in FIG. 3 also the annular floor part denoted with 8a' is designed as a conical plane. The generatrices of the conical plane 8a' enclose with the probe axis an angle of 80°, i.e. the angle $\beta$ to the horizontal line amounts to +10°; when the angle of this plane to the probe axis amounts to 120° the angle $\beta$' to the horizontal line amounts to −30°.

The preferred embodiment is illustrated in FIG. 2, in which the width of the annular floor part 8a corresponds to about the width of the front face 21 and the angle of the floor part to the probe axis is a right angle. Here the angle $\beta$ is zero and the front face 21 encloses with the vertical jacket plane an angle $\alpha$ of 90°. The angle $\alpha$ may amount to from 60° to 100° and, respectively, the corresponding inclination angle of the generatrices of the floor part 8a or 8a' to the horizontal line may lie between zero and the angle $\beta$ or $\beta'$. It has been shown that when these conditions are maintained the refractory jacket 19 does not burst off in the area of the front face 21 or 21'. Practical tests have shown that with an angle of $\beta$ being −45° or with an angle of $\alpha$ being 45° the measuring probes are no longer able to function; for then the front face 21 of the refractory jacket 19 is destroyed and liquid steel penetrates the gap between the jacket 19 and the outer tube 7'.

For obtaining advantegeous and uniform flow conditions the formation of the water guiding tube in the transition part should be similar to the formation of the annular floor part, i.e. both parts are to show the same inclination.

We claim:

1. A water-cooled measuring probe for continuously measuring the temperature of hot liquid metal baths in large basic oxygen converters, comprising
   a probe body,
   circulation means in the probe body for circulating cooling water,
   a probe head attached to the probe body in shoulder-like fashion, the junction between the probe head and probe body defining an annular floor part,
   the annular floor part being positioned at an angle of 80°–120° in relation to the longitudinal axis of the probe,
   a sensing portion attached to the probe head,
   a refractory jacket releasably attached to the probe and surrounding the probe head and sensing portion, and
   ramming mass positioned between the annular floor part and the refractory jacket.

2. A water-cooled measuring probe for continuously measuring the temperature of hot liquid metal baths in large basic oxygen converters, comprising
   a probe body,
   a probe head attached to the probe body in shoulder-like fashion, the junction between the probe head and probe body defining an annular floor part,
   first circulation means in the probe head for circulating cooling water and second circulation means in the probe body for circulating cooling water, said first circulation means being branched off from said second circulation means,
   the annular floor part being positioned at an angle of 80°–120° in relation to the longitudinal axis of the probe,
   a sensing portion attached to the probe head, and
   a refractory jacket releasably attached to the probe and surrounding the probe head and sensing portion.

* * * * *

& -1050
(5/69)

UNITED STATES PATENT OFFICE
CERTIFICATE OF CORRECTION

Patent No. 3,757,579    Dated Sept. 11, 1973

Inventor(s) Hellmuth Smejkal et al

It is certified that error appears in the above-identified patent and that said Letters Patent are hereby corrected as shown below:

First page, Item [73], "Stahlweke" should be --Stahlwerke--; and

Col. 2, line 58, "part 8 of" should read --part 8--.

Signed and sealed this 1st day of January 1974.

(SEAL)
Attest:

EDWARD M. FLETCHER, JR.
Attesting Officer

RENE D. TEGTMEYER
Acting Commissioner of Patents